Figure 2:
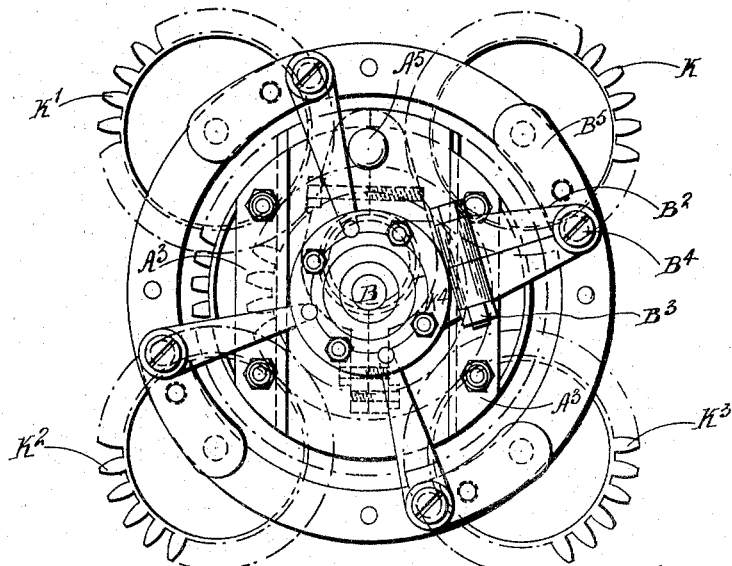

H. E. WILLIAMS.
VARIABLE SPEED GEAR.
APPLICATION FILED JAN. 27, 1908.

928,486.

Patented July 20, 1909.

3 SHEETS—SHEET 1.

Witnesses.
Percy M. Goodwin.
Robt Hunter

Inventor.
Herbert Edward Williams.
by his Attorney.
Benj. V. Ling.

H. E. WILLIAMS.
VARIABLE SPEED GEAR.
APPLICATION FILED JAN. 27, 1908.
928,486.
Patented July 20, 1909.
3 SHEETS—SHEET 2.
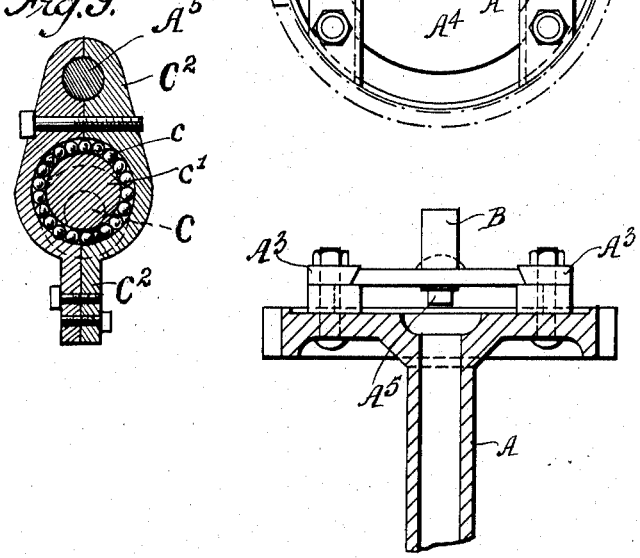

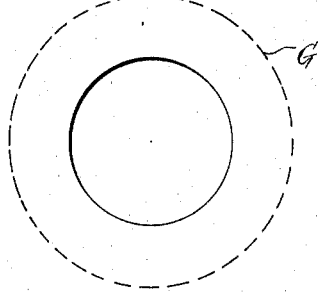
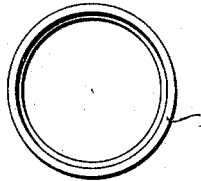
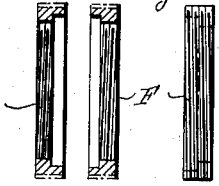
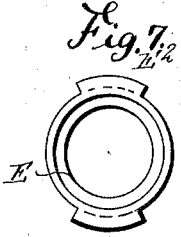
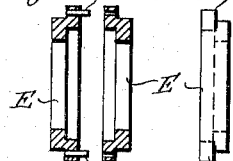
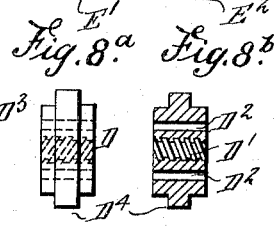

UNITED STATES PATENT OFFICE.

HERBERT EDWARD WILLIAMS, OF PORTSMOUTH, ENGLAND.

VARIABLE-SPEED GEAR.

No. 928,486.  Specification of Letters Patent.  Patented July 20, 1909.

Application filed January 27, 1908. Serial No. 412,867.

*To all whom it may concern:*

Be it known that I, HERBERT EDWARD WILLIAMS, a subject of the King of Great Britain and Ireland, and resident of Burling House, Monmouth Road, North End, Portsmouth, county of Hants, England, have invented certain new and useful Improvements in Variable-Speed Gear, of which the following is a specification.

My invention relates to variable speed gear, such for example as is required in motor vehicles.

My invention operates to vary the radial distance between a pin and the axis about which it is caused to move in a circle, and the main difficulty which I endeavor to surmount is that of producing this variation at a moment when the pin is actually moving in its orbit.

My invention consists in principle in mounting the pin parallel to the axis of revolution, in such a manner that it may slide radially to and from the axis. The pin is connected to the strap of an eccentric (or by a connecting rod to a crank, or to a cam) whose axis of revolution is in the same straight line as that of the pin. Normally the pin and the eccentric revolve together and have a fixed relation to each other; but if the eccentric be moved relatively to the pin, the pin will be moved to or from the axis of revolution and its orbit will consequently be diminished or enlarged, although its angular velocity will remain constant.

In carrying my invention into effect I mount the eccentric upon one end of a shaft, a portion of the opposite end of which is smaller in diameter and has a screw thread cut upon it. This shaft is surrounded by a hollow second shaft which carries a wheel disk or crank which bears projecting from its face parallel to the axis of revolution the pin whose position is to be varied. The pin is carried on a slide which moves in guides across the face of the wheel or disk, and this slide is connected to the strap of the eccentric which lies close to the slide. The pin is connected to the part to which a variable speed is to be imparted, in any suitable manner (as by actuating a pawl and ratchet wheel). The hollow shaft and consequently the wheel which carries the pin is the part which is driven at a regular speed. The relative rotation of the two shafts is produced in the following way. That part of the hollow shaft which incloses the diminished and threaded portion of the eccentric-bearing shaft has longitudinal slots cut in it, and a nut with an interior thread passes over the threaded portion of the eccentric-bearing shaft and is provided with wings which pass through the slots in the hollow shaft, so that if the nut be pushed along it cannot rotate but causes the interior shaft to rotate relatively to the hollow shaft, and the eccentric (or crank and connecting rod) causes the pin to move in or out from the center. Normally the eccentric-bearing shaft and the hollow shaft rotate at the same angular velocity, since the longitudinal position of the nut is fixed, and the two shafts are consequently locked together.

I will now describe my invention with reference to the accompanying drawings, it being clearly understood that the nature of my invention is not limited to the particular apparatus shown, but comprises any analogous way of carrying the principle into effect.

Figure 1:
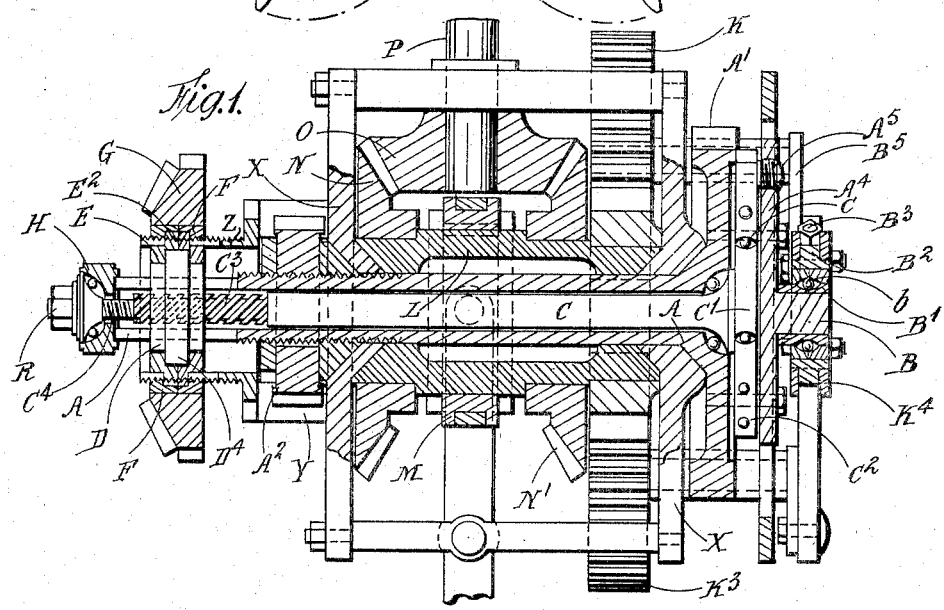

Figure 1 is a longitudinal section of a gear system constructed to work according to my invention. Fig. 2 is an end elevation looking from the right. Fig. 3 is an end elevation of the wheel carrying the slide and pin, looking from the right. Fig. 4 is a plan view partly in section of the same. Fig. 5, is a view in outline of the preferred form of nut-moving wheel of the adjusting means or contrivance for varying the relative motion of the shaft. Fig. $5^a$ is a broken vertical section of said nut moving wheel. Fig. 6, is a face view of one of the ring members arranged in connection with said nut moving or manipulating wheel. Figs. $6^a$ and $6^b$ are vertical sections of said ring members. Fig. $6^c$ is an edge view of one of said ring members. Fig. 7, is a face view of the nut inclosing casing. Figs. $7^a$ and $7^b$ are vertical sections of the duplicate members or halves of said casing. Fig. $7^c$ is an edge view of one of said casing members or halves. Fig. 8, is a face view of the adjusting nut. Fig. $8^a$ is an edge view of the same, and Fig. $8^b$ is a transverse section thereof, and Fig. 9, is a detailed vertical section, disclosing more especially the eccentric, strap and ball bearing connection between one of the shafts and the slide bearing a crank pin and the motion transmitting pin later more fully described.

Referring now to Figs. 1, 2, 3 and 4:—A is a hollow shaft revolving freely in bearings in the casing X. Two wheels A' and $A^2$ are mounted fast on it and by means of either one of these wheels which may be spur or belt driven regular rotation is imparted to the shaft A. The wheel A' has guides A³ bolted to its face and sliding in these guides is a plate A⁴. Near one end of the plate is a connecting pin A⁵ by means of which it is moved in the guides in the manner to be described presently. From the face of the plate A⁴ projects the crank pin B and it is the position of the plate A⁴ in the guides and consequently the distance of the crank pin B from the axis of rotation that determines the speed to be ultimately produced. Inside the hollow shaft A is the shaft C with an eccentric C' mounted upon it. This eccentric is embraced by the strap C² built up of two halves bolted together (only one of the halves is shown in Fig. 1), a race of balls c being provided to minimize friction. The extremity of the strap embraces the connecting pin A⁵. It will be seen that the rotation of the shaft C relatively to the shaft A will produce a variation in the position of the slide A⁴ and consequently of the crank pin B. That end of the shaft C which is opposite to the eccentric C' is reduced and has a thread C³ cut upon it (preferably at an angle of 45°), and farther on at the end of the shaft is another thread C⁴. The hollow shaft A is slotted longitudinally at the portion covering the thread C³. Fitting over the thread C³ is a nut D (see Fig. 5) provided with an internal thread D' and with semi-circular slots D² to take over the segments of the shaft A left by cutting the longitudinal slots, the portions D³ projecting between these longitudinal slots at right angles thereto. A rib D⁴ extends around the periphery of the nut. It is clear that if the nut be pushed along the two shafts it will be unable to rotate relatively to the hollow shaft A, but the shaft C will be forced to rotate. I will next describe, with reference to Figs. 1 and 5, the means employed to thrust the nut along the shafts.

Mounted on the casing X are four brackets Y which are continued and united to form a tubular extension Z on which is cut a thread. The tubular extension is slotted longitudinally in much the same way as the hollow shaft A. The nut D is inclosed in a casing E built up of two parts united together by steady-pins E' and provided with extensions E² which project through the longitudinal slots in the tubular extension Z. The nut D when carried around by the shaft A can revolve freely in this casing. The extensions E² where they project through the slots in the extension Z are held loosely between the rings F which are screwed into the outer wheel G from opposite sides by means of threads cut on their outer surfaces and by means of the threads on their inner surfaces they are screwed on to the extension Z. This arrangement of the rings F and the wheel G is for convenience in assembling and when in use they are to all intents and purposes one piece. By turning the wheel G the nut D may be thrust backward and forward on the shafts. In the drawings the wheel G is shown provided with both spur and bevel teeth, but any suitable means of operation may be employed. The shaft C and the shaft A are tightened up together by means of a nut R and a ball race H.

I will now describe the method of transmitting motion from the crank pin B. Around this pin is a collar B¹ provided with a race of balls b and surrounded by a strap B² formed of two parts held together by a bolt B³. The extremities of the parts B² are attached by means of a pin B⁴ to a crank B⁵, having suitable connection with the spur wheel K which tends to turn it always in one direction, the extent of each step being determined by the extent of the orbit of motion of the crank pin B. In order to prevent the motion ultimately obtained from having a too-markedly step-by-step character similar wheels K¹, K², K³ are provided which are driven by connecting rods attached to a ring K⁴ bolted to the strap B². The spur wheels K, K¹, K², K³ gear with teeth on a tube L which revolves freely in the casing X and on the shaft A, and fast on this tube, but capable of sliding longitudinally thereon is a dog-clutch M which can be thrown into gear with the bevel wheels N or N¹ (according to the direction required). These wheels run freely on the tube L and gear with the bevel wheel O fast on the shaft P. Thus the speed of the shaft P may be varied by revolving the wheel G, though the speed imparted to the shaft A remains constant; the extent of the orbit of the crank pin B being changed though its angular velocity may remain constant.

Having now described my invention, what I claim as new and desire to secure by Letters Patent of the United States is:—

1. A variable speed gear comprising concentric shafts, means for imparting motion to one of said shafts, a slide applied to one of said shafts and provided with a crank and the motion transmitting pin, an eccentric and strap connection between said crank member and one of said shafts and means for effecting the relative adjustment of said shafts.

2. A variable speed gear comprising concentric shafts, motion transmitting means for one of said shafts, a slide applied to one of said shafts and provided with a crank and the motion transmitting pin, an eccentric and strap connection between said crank member and one of said shafts, an additional crank member, means of connection between said pin and said additional crank member, and means for effecting the relative adjustment between said shafts.

3. A variable speed gear comprising a tubular shaft, means for actuating it, a second shaft arranged within the aforesaid shaft, a slide having a connecting pin and a crank pin, and carried by one of said shafts, an eccentric carried by the other of said shafts and having strap connection with said crank pin, an additional crank, means of connection between the first noted pin and said additional crank, and means for effecting the relative adjustment between said shafts.

4. A variable speed gear comprising concentric shafts, means for actuating one of said shafts, a slide applied to one of said shafts and provided with a crank and the motion transmitting pin, an eccentric and strap connection between said crank member and one of said shafts, a screw threaded wheel and its correspondingly threaded support, and a nut arranged upon one of said shafts and controlled by the action of said wheel.

5. A variable speed gear comprising concentric shafts, means for actuating one of said shafts, a slide applied to one of said shafts and provided with a crank and the motion transmitting pin, one of said shafts having slots, an eccentric and strap connection between said crank member and one of said shafts, a nut threaded upon one of said shafts, a two-part housing or casing for said nut, adapted to permit said nut turning freely therein and having opposed extensions received by the slots in one of said shafts and in a separate support therefor, and a manually actuated wheel threaded upon said support and having screw threaded connection with said wheel.

6. A variable speed gear comprising concentric shafts, means for actuating one of said shafts, a slide applied to one of said shafts and provided with a crank and the motion transmitting pin, an eccentric and strap connection between said crank member and one of said shafts, a nut threaded upon one of said shafts, a sectional housing or casing for said nut, adapted to permit said nut to turn freely therein and having opposed extensions received by slots, in one of said shafts, and in a separate support therefor, a manually actuated wheel threaded upon said support and having connection with said housing, an additional nut also threaded upon one of said shafts, and a collar or bearing interposed between said latter nut and the other of said shafts.

In testimony whereof I have affixed my signature in presence of two witnesses.

HERBERT EDWARD WILLIAMS.

Witnesses:
H. H. PEACH,
A. J. WHETTEM.